United States Patent [19]

Huff

[11] 3,972,533
[45] Aug. 3, 1976

[54] SIGNAL PICKUP LIFTING/LOWERING APPARATUS

[75] Inventor: Larry Dean Huff, Indianapolis, Ind.
[73] Assignee: RCA Corporation, New York, N.Y.
[22] Filed: Feb. 3, 1975
[21] Appl. No.: 546,470

[52] U.S. Cl. .............................. 274/23 R; 178/6.6 R
[51] Int. Cl.² ........................................... G11B 3/10
[58] Field of Search ................... 274/23; 178/6.6 R

[56] References Cited
UNITED STATES PATENTS

| | | | |
|---|---|---|---|
| 2,551,506 | 5/1951 | Rockwell | 274/23 R |
| 3,647,224 | 3/1972 | Klein | 274/23 R |
| 3,675,932 | 7/1972 | Rabinow | 274/23 A |
| 3,774,917 | 11/1973 | Aso | 274/23 R |
| 3,814,441 | 6/1974 | Craggs | 274/23 R |
| 3,873,762 | 3/1975 | Taylor | 274/23 R |

Primary Examiner—Richard E. Aegerter
Assistant Examiner—John W. Shepperd
Attorney, Agent, or Firm—Eugene M. Whitacre; William H. Meagher; Dilip A. Kulkarni

[57] ABSTRACT

A stator having a mating surface is fixedly mounted in a pickup arm housing of a disc record player. A rotor, also having a mating surface, is rotatably mounted such that the stator and the rotor mating surfaces are juxtaposed with a thin deposit of damping material interposed therebetween. A pickup arm rest is secured to the rotor for supporting a pickup arm which is pivoted at one end thereof in the housing. A cord is secured to the rotor for causing rotation thereof in a direction that causes the arm rest to lift the pickup arm away from the player turntable when the player is inoperative. When the cord is released, the rotor is free to rotate. A coil spring biases (1) the damped mating surfaces of the stator and the rotor toward each other, and (2) the rotor in a direction that causes the arm rest to lower the pickup arm toward the turntable, in order to effect a smooth landing of a delicate signal pickup on a disc record disposed on the turntable for playback when the cord is released.

3 Claims, 6 Drawing Figures

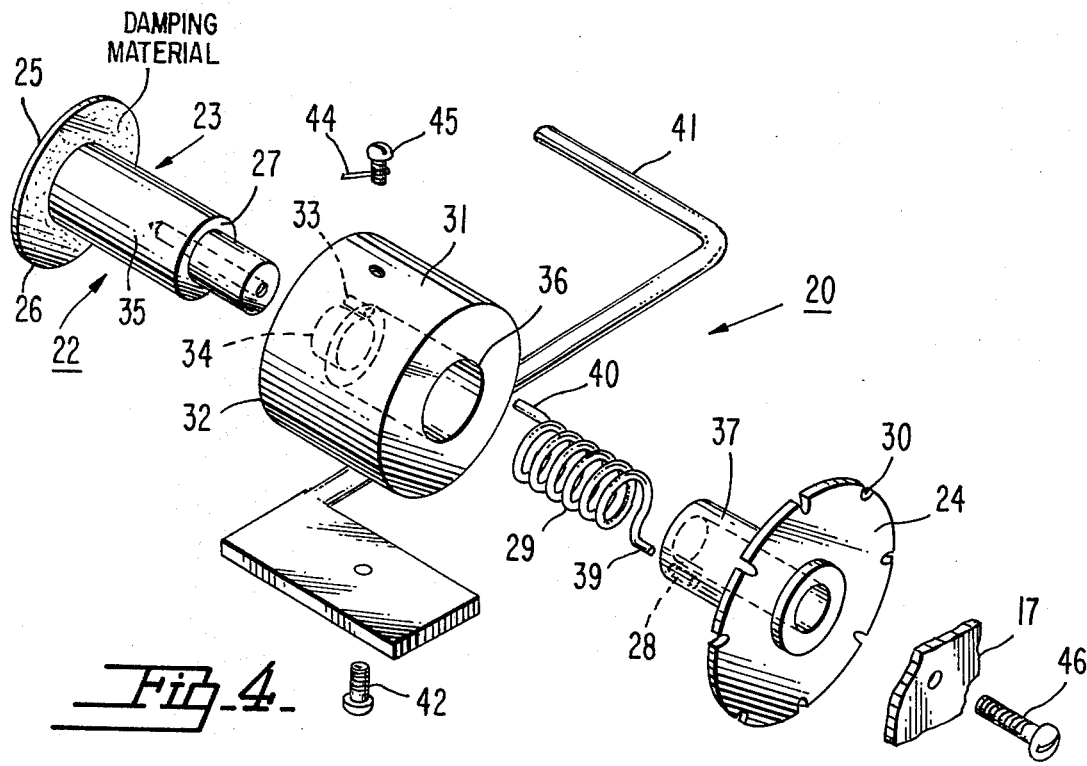
Fig. 4
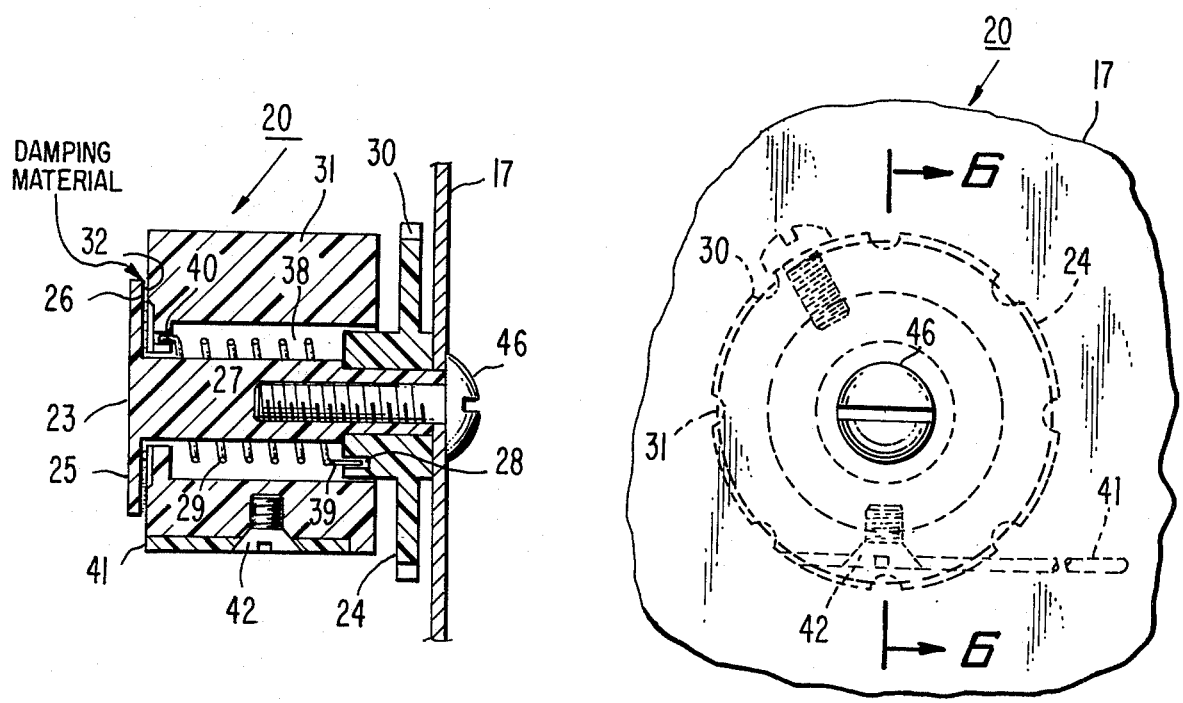
Fig. 6
Fig. 5

SIGNAL PICKUP LIFTING/LOWERING APPARATUS

The present invention relates to disc record player pickup arm systems, and more particularly relates to an apparatus for effecting a smooth landing of a delicate signal pickup on a disc record disposed on a turntable of the player.

BACKGROUND OF THE INVENTION

In certain video disc systems, video information is recorded by means of geometric variations in the bottom of a smooth spiral groove on the surface of a disc record. The disc record surface includes a coating of conductive material which is preferably covered with a thin deposit of dielectric material. A signal pickup, supported at one end of a pickup arm, engages the spiral groove and includes a conductive electrode which establishes a capacitance with the conductive coating and the dielectric deposit of the disc record. When the disc record is rotated, the electrode-disc capacitance varies in response to the geometric variations in the bottom of the spiral groove passing beneath the signal pickup. The capacitance variations are converted to electrical signal variations by suitable signal processing circuitry coupled to the pickup electrode. The output signal of the signal processing circuitry may be coupled to a conventional television receiver for reproduction. The pickup arm is mounted on a signal pickup housing of the playback system. A system of the aforementioned type is described in detail in U.S. Pat. No. 3,842,194, issued on Oct. 15, 1974 to Jon K. Clemens.

Video disc systems of the aforementioned type generally utilize disc records having groove densities in the order of four to eight thousand groove convolutions per inch. A typical video disc record of this type may have a groove convolution spacing in the order of 3.5 microns. The fragile walls of relatively narrow grooves of the disc record cannot be dependably relied upon to pull the pickup arm assembly, around the pickup arm pivot support, across the entire recorded surface of the disc record. Also, in video disc systems utilizing the variable capacitor concept, it is desirable for accurate reproduction of the prerecorded signals that the signal pickup electrode maintain a substantially constant attitude in the spiral groove. Therefore, a radial feed drive mechanism is provided for traversing the signal pickup housing in proper time relationship with the radial motion of the signal pickup tip engaged in the spiral groove so as to continuously maintain the longitudinal axis of the pickup arm substantially tangential to the spiral groove at the point of engagement when the player is in a playback mode. Reference may be made to the copending U.S. application of F. R. Stave, Ser. No. 351,600, filed Apr. 16, 1973, entitled "VIDEO DISC PLAYBACK APPARATUS", and now U.S. Pat. No. 3,870,835, for an illustration of a suitable radial feed drive mechanism for providing the indicated radial motion.

Further, in the aforesaid video disc systems, adequate bandwidth for monochrome and color display is obtained by rotating the disc at a speed substantially higher (e.g., 450 rpm) than the conventional audio playback speeds (e.g., 33 and one-third rpm).

Additionally, in the above-mentioned video disc systems, groove engaging and low mass requirements of a signal pickup assembly result in a signal pickup unit which is extremely delicate (e.g., signal pickup width 2 microns, signal pickup depth 5 microns, signal pickup electrode width 2 microns, and signal pickup electrode depth 0.2 microns).

In the playback systems of the aforementioned type, it is desirable to effect a smooth landing of the signal pickup on the disc record disposed on the turntable for the following illustrative reasons. First, the disc record has fragile grooves (e.g., groove spacing 3.5 microns). Second, the signal pickup is delicate (e.g., signal pickup electrode depth 0.2 microns, and signal pickup electrode width 2.0 microns). Third, the disc record is rotated at a relatively high speed (e.g., 450 rpm). Fourth, the signal pickup electrode dimensions are critical due to a relatively high frequency video recording in the disc record grooves (e.g., 4 megacycles).

Further, it is desirable to provide a signal pickup lowering apparatus (1) which is relatively simple and rugged in construction, (2) which will provide a repeatable control of the signal pickup landing on the disc record, and (3) which will be suitable for relatively inexpensive mass manufacturing techniques.

SUMMARY OF THE INVENTION

A stator having a mating surface is fixedly secured to a pickup arm housing of a disc record player. A rotor, also having a mating surface, is rotatably mounted such that the stator and the rotor mating surfaces are juxtaposed with a thin deposit of damping material interposed therebetween. A pickup arm rest is secured to the rotor for supporting a pickup arm which is pivoted at one end thereof in the housing. Actuating means are provided for effecting rotation of the rotor in a direction that causes the arm to lift the pickup arm away from the player turntable when energized. Actuating means free the rotor when de-energized. Means are provided for biasing (1) the damped mating surfaces of the stator and the rotor toward each other, and (2) the rotor in a direction that causes the arm rest to lower the pickup arm toward the turntable, thereby effecting a smooth landing of the signal pickup on the disc record for playback when the actuating means are de-energized.

BRIEF DESCRIPTION OF THE DRAWINGS

Objects, features, and advantages of the present invention will be more fully understood from the following detailed description of the preferred embodiment, the appended claims, and the accompanying drawings in which:

FIG. 4 is an exploded, exaggerated view of the signal pickup lowering apparatus of FIGS. 1, 2, and 3;

FIG. 5 is an end view of the signal pickup lowering apparatus of FIGS. 1, 2, 3, and 4; and FIG. 6 is a sectioned side view of the signal pickup lowering apparatus along the line 6—6 of FIG. 5.

DETAILED DESCRIPTION OF THE PREFERRED EMBODIMENT

Figure 1:
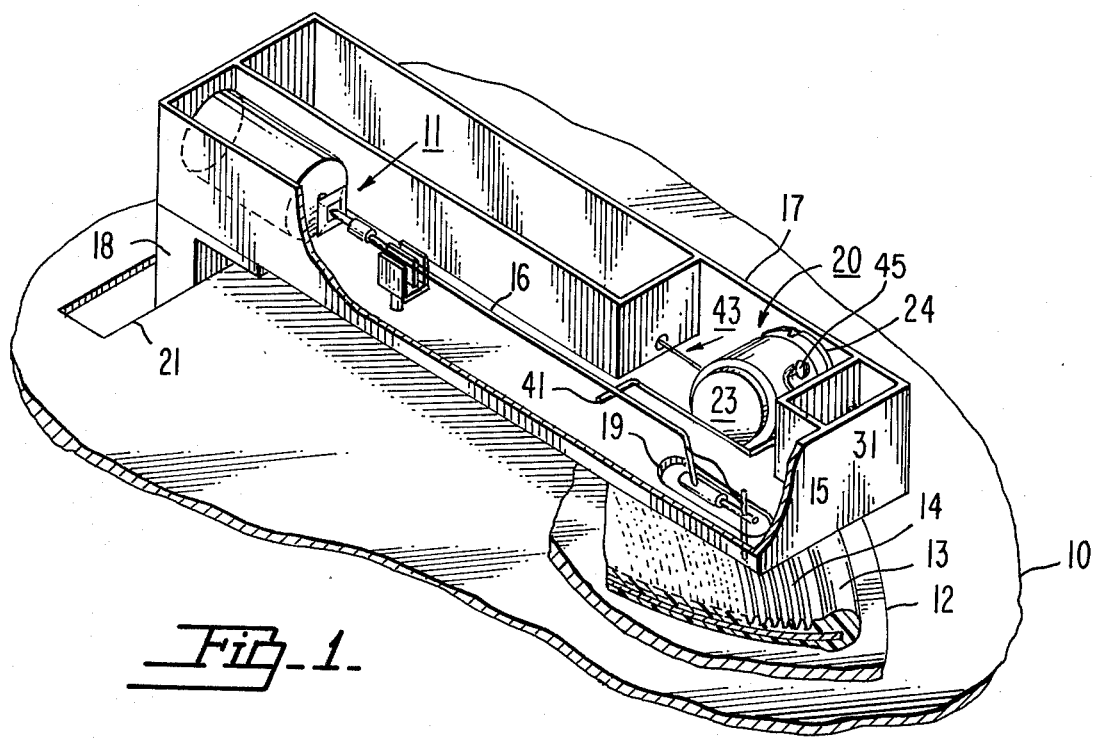
FIG. 1 is a partially cut-away, perspective view of a video disc record player incorporating a preferred embodiment of a signal pickup lowering apparatus pursuant to the present invention, the pickup arm housing lid being removed to expose the details.
Figure 2:
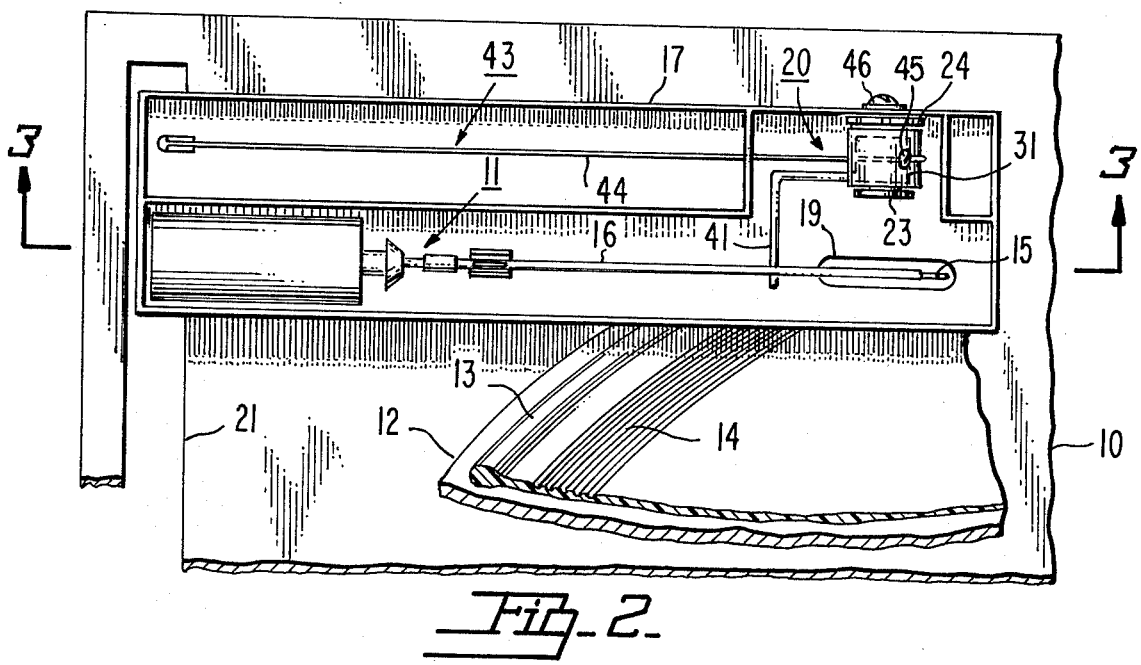
FIG. 2 is an exaggerated top view of a portion of the video disc record player of FIG. 1, illustrating the signal pickup lowering apparatus actuating cord.
Figure 3:
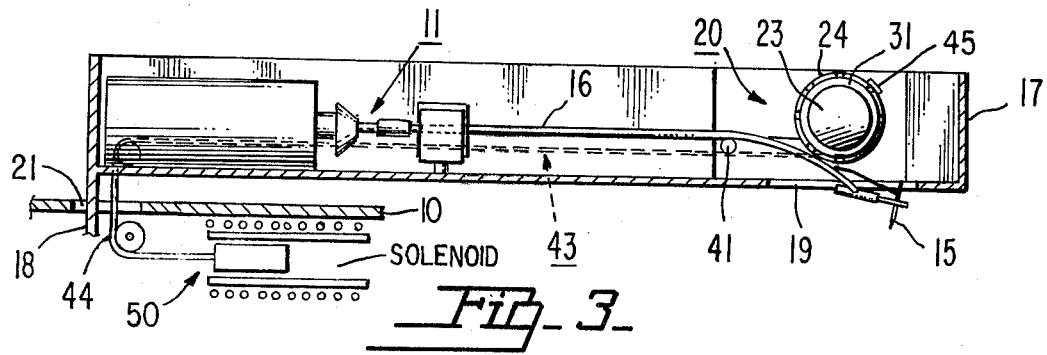
FIG. 3 is a partially cut-away, sectioned side view of the signal pickup lowering apparatus along the line 3—3 of FIG. 2.

Referring to the drawings, wherein like reference numerals designate similar elements in the various views, in FIGS. 1, 2, and 3 a video disc player is shown having a base 10. The player is suitable for use in a video disc system such as disclosed in the aforementioned Clemens patent. A turntable 12 is rotatably mounted on the base 10. The upper surface of the turntable 11 is adapted to support a video disc record 13. Video information is recorded by means of geometrical variations in the bottom of a smooth spiral groove 14 on the substrate of the disc record 13. The disc record 13 surface includes a conductive coating which is preferably covered with a thin deposit of dielectric material. A signal pickup 15, supported at one end of a conductive pickup arm 16, engages the spiral groove 14 and includes a conductive electrode (not shown) which, together with the conductive coating and the dielectric deposit, form a capacitor. When relative motion is established between the signal pickup 15 and the disc record 13, an edge of the electrode included in the signal pickup, while riding in the spiral groove 14, serves as an electrode of a capacitor varying due to the geometric variations in the bottom of a smooth spiral groove passing beneath. The other end of the pickup arm 16 is flexibly supported by a pickup arm pivot 11 carried by a signal pickup housing 17.

As indicated before, a radial feed drive mechanism 18 traverses the pickup arm pivot 11 mounted in the signal pickup housing 17 in proper time relationship with the radial motion of the signal pickup 15 tip engaged in the spiral groove 14 so as to continuously maintain the longitudinal axis of the pickup arm substantially tangential to the spiral groove at the point of engagement. Slot 21 is provided in the base 10 for accommodating the radial motion of the housing 17. Reference may be made to the aforementioned copending Stave application (U.S. Pat. No. 3,870,835) for an illustration of a suitable feed drive mechanism for providing the indicated radial motion.

During playback, the pickup arm 16 passes through an opening 19 in the bottom wall of the carriage 17 to allow the signal pickup 15 to ride in the spiral groove 14. The pickup arm 16 rests on an arm rest of a signal pickup lowering apparatus 20, to be described subsequently.

Reference will now be made to FIGS. 4, 5, and 6 illustrating, respectively, an exploded view, an end view, and a partially sectioned side view of the signal pickup lowering mechanism 20.

A stator 22 comprises a base member 23 and an anchor member 24. The base 23 has a head portion 25 having a mating surface 26. The anchor 24 is seated against shoulder portion 27 of the base 23. The anchor 24 may be secured to the base 23 by any suitable means. In the preferred embodiment the anchor 24 is press fitted to the base 23. The base 23 is secured to the housing 17 by any suitable means, for example, a fastener 46. The anchor 24 has (1) an opening 28 for securing a first end 39 of a coil spring 29, and (2) grooved periphery 30 for adjusting the coil spring 29 bias, in the manner described subsequently.

A rotor 31, also having a mating surface 32, is rotatably mounted between the base 23 and the anchor 24 such that the stator mating surface 26 and the rotor mating surface 32 are juxtaposed. A drop of damping material (ilustratively, silicone fluid) is introduced between the two mating surfaces (26 and 32) in order to interpose a thin deposit of damping material therebetween. The silicone fluid (Dimethylpolysiloxane, viscosity at 25°C: 10,000 c.s.) may be of the type marketed by Dow Corning Corp., Midland, Michigan, U.S.A. The rotor 31 has (1) a first opening 33 for securing a second end 40 of the coil spring 29, (2) a second opening 34 through which a stem portion 35 of the base 23 is inserted, and (3) a third opening 36 through which a shank portion 37 of the anchor is inserted. When the rotor 31 is mounted between the base 23 and the anchor 24, the stem portion 35 of the base and the rotor opening 36 define an annular cavity 38 (FIG. 6) in which the coil spring 29 is seated. A pickup arm rest 41 is secured to the rotor 31 by a fastener 42 for supporting the pickup arm 16 when the player is inoperative.

Actuating means 43 (FIGS. 2 and 3) are provided for causing rotation of the rotor 31 in a direction that causes the arm rest 41 to lift the pickup arm 16 away from the turntable 12 when energized. The actuating means free the rotor 31 when de-energized. In the preferred embodiment, actuating means include a cord 44 secured to the rotor 31 by a fastener 45. Any suitable means, such as a solenoid 50 (FIG. 3), may be used, which when energized would pull the cord 44 for causing rotation of the rotor 31.

The coil spring 29 biases (a) the damped mating surfaces (26 and 32) of the stator 22 and the rotor 31 toward each other, and (b) the rotor in a direction that causes the arm rest 41 to lower the pickup arm 16 toward the turntable 12, in order to effect a smooth landing of the signal pickup on the disc record 13 for playback when the actuating means 43 is de-energized.

It may be observed that (1) although a coil spring is used in the preferred embodiment, any other suitable means may be used for biasing the rotor and the stator in the manner indicated above, and (2) that the functions of the member 31, the base 23, and the anchor 24 may be interchanged.

Pursuant to another embodiment of the actuating means 43, a cam member is fixedly secured on the rotor subject to engagement with an actuator reciprocably mounted in the carriage 17. The actuator is normally biased in a direction that causes the arm rest 41 to raise the pickup arm 16 away from the turntable 12. A solenoid structure mounted adjacent to the actuator, when energized, moves the actuator against the normal bias in a direction that frees the rotor 31. The coil spring 29 causes rotation of the rotor 31 in a direction that effects a smooth landing of the signal pickup 15 on the disc record 13 for playback when the rotor is freed. A feature of this arrangement is that the fragile signal pickup 15 is protected in the event of accidental power failure or cut-off as the actuator is normally biased to raise the pickup arm 16 when the solenoid is de-energized.

The operation of the signal pickup lowering mechanism may be represented approximately by the following equation.

$$J \frac{d^2w}{dt^2} + F \frac{dw}{dt} + Kw = T$$

In the above equation constants $J$, $F$, and $K$ represent respectively the inertia, damping, and the stiffness characteristics of the lowering mechanism. Further, $w$ represents angular displacement of the rotor to the input torque $T$. In the signal pickup lowering mechanism appropriate selection of the constants $J$, $F$, and $K$ is made to provide a substantially linear lowering of the pickup arm toward the turntable in order to effect a smooth and calm set-down of the delicate signal pickup on the high density disc record having fragile grooves for playback when the actuating means are de-energized.

What is claimed is:

1. A disc record player for recovering prerecorded signals from a disc record comprising the combination of:
    A. a turntable for rotatably supporting a disc record;
    B. a pickup arm;
    C. a signal pickup mounted at one end of said pickup arm;
    D. a pickup arm housing said pickup arm being pivoted at the end thereof remote from said one end within said pickup arm housing for rotation about a first axis parallel to said turntable;
    E. a stator fixedly mounted in said pickup arm housing and having a mating surface;
    F. a rotor also having a mating surface;
    G. means for mounting said rotor in said pickup arm housing for rotation about a second axis which is spaced from said pickup arm axis such that said stator and said rotor mating surfaces are juxtaposed;
    H. a thin deposit of damping material interposed between said juxtaposed mating surfaces;
    I. a pickup arm rest secured to said rotor for engaging said pickup arm in a region thereof remote from said pivoted end of said pickup arm;
    J. actuating means including a movable member which is mounted for motion between a first location and a second location;
    K. means for coupling said movable member to said rotor; said movable member establishing a first rotational position for said rotor that causes said arm rest to hold said pickup arm in an elevated position relative to said turntable when said movable member is in said first location; said movable member freeing said rotor for rotation away from said first rotational position when said movable member is in said second location; and
    L. means for biasing said damped mating surfaces of said stator and said rotor toward each other; said biasing means also serving to bias said rotor in a direction that causes said arm rest to lower said pickup arm toward said turntable, in order to effect a smooth landing of said signal pickup on a disc record for playback, when said rotor is freed;
    wherein said biasing of said rotor and the location of said engaging region of said pickup arm relative to said arm rest is such as to cause continuation of the rotation of said rotor after said signal pickup engages said disc record to move said arm rest away from said pickup arm when said rotor is freed.

2. A system as defined in claim 1 wherein the rotor comprises a barrel having a through opening and a mating surface, wherein the stator comprises a base member and an anchor member, wherein the base member has a head portion having a mating surface at one end thereof, wherein the anchor member is secured to the end of the base member remote from the one end, wherein the base member is fixedly mounted to the housing, wherein the barrel is rotatably mounted between the base and the anchor members defining an annular cavity therebetween, and wherein the biasing means comprises a coil spring mounted in the annular cavity having its ends secured respectively to the stator anchor member and the rotor barrel.

3. A record player for recovering prerecorded signals from a record comprising the combination of:
    A. a turntable for rotatably supporting a record;
    B. a pickup arm;
    C. a signal pickup mounted at one end of said pickup arm;
    D. a pickup arm housing; said pickup arm being pivoted at the end thereof remote from said one end within said pickup arm housing for rotation about a first axis parallel to said turntable;
    E. a stator fixedly mounted in said pickup arm housing and having a mating surface;
    F. a rotor also having a mating surface;
    G. means for mounting said rotor in said pickup arm housing for rotation about a second axis which is spaced from said pickup arm axis such that said stator and said rotor mating surfaces are juxtaposed;
    H. a thin deposit of damping material interposed between said juxtaposed mating surfaces;
    I. a pickup arm rest secured to said rotor for engaging said pickup arm in a region thereof remote from said pivoted end of said pickup arm;
    J. actuating means selectively subject to energization; said actuating means including a movable member which is mounted for motion between a first location and second location; said actuating means in its de-energized state establishing said first location for said movable member; said actuating means in its energized state establishing said second location for said movable member;
    K. means for coupling said movable member to said rotor; said movable member establishing a first rotational position for said rotor that causes said arm rest to hold said pickup arm in an elevated position relative to said turntable when said movable member is in said first location; said movable member freeing said rotor for rotation away from said first rotational position when said movable member is in said second location; and
    L. means for biasing said damped mating surfaces of said stator and said rotor toward each other; said biasing means also serving to bias said rotor for rotation in an arm rest lowering direction;
    wherein energization of said actuating means frees said rotor for rotation thereof in said arm rest lowering direction in response to said biasing means; and
    wherein said biasing of said rotor by said biasing means is sufficient to effect, when said rotor is freed, rotation of said rotor in said arm rest lowering direction beyond a rotational positioning permitting record engagement by said signal pickup to allow said arm rest to reach a lowered position free from engagement with the record supported pickup arm.

* * * * *